(12) United States Patent
Khayrallah

(10) Patent No.: US 10,560,868 B2
(45) Date of Patent: Feb. 11, 2020

(54) TERMINAL-AIDED BACKHAUL COMPRESSION

(71) Applicant: GUANGDONG OPPO MOBILE TELECOMMUNICATIONS CORP., LTD., Dongguan (CN)

(72) Inventor: Ali S. Khayrallah, Mountain View, CA (US)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 14/465,374

(22) Filed: Aug. 21, 2014

(65) Prior Publication Data

US 2016/0135082 A1 May 12, 2016

(51) Int. Cl.
*H04W 4/00* (2018.01)
*H04W 28/06* (2009.01)
*H04W 4/18* (2009.01)

(52) U.S. Cl.
CPC ............ *H04W 28/06* (2013.01); *H04W 4/18* (2013.01)

(58) Field of Classification Search
CPC . H04W 76/022; H04W 84/045; H04W 76/02; H04W 80/04; H04W 40/20; H04W 12/06; H04W 72/0406; H04W 72/0426; H04W 88/085
See application file for complete search history.

(56) References Cited

U.S. PATENT DOCUMENTS

| | | | | |
|---|---|---|---|---|
| 8,098,662 B2* | 1/2012 | Prakash | ............ | H04L 29/12028 370/392 |
| 8,134,952 B2* | 3/2012 | Prakash | ............ | H04L 29/12028 370/328 |
| 8,416,751 B2* | 4/2013 | Prakash | ............ | H04L 29/12028 370/338 |
| 8,498,296 B2* | 7/2013 | Bitar | ...................... | H04L 45/00 370/392 |
| 8,626,903 B2* | 1/2014 | Liu | ..................... | H04L 65/4069 709/224 |
| 2006/0159054 A1* | 7/2006 | Kobayashi | .............. | H04L 45/64 370/338 |
| 2006/0262735 A1* | 11/2006 | Guichard | ................ | H04L 12/66 370/254 |
| 2008/0008111 A1* | 1/2008 | Prakash | ............ | H04L 29/12028 370/310 |
| 2010/0215024 A1 | 8/2010 | Chiang | | |

(Continued)

FOREIGN PATENT DOCUMENTS

WO 2012003759 A1 1/2012

*Primary Examiner* — Sai Aung
(74) *Attorney, Agent, or Firm* — Finnegan, Henderson, Farabow, Garrett & Dunner LLP

(57) ABSTRACT

A delegate wireless terminal can receive and store messages sent to it by a receiving network node. The wireless terminal can identify a message label based on a mapping for the received message. A transmitting network node can transmit a message label to a receiving network node across a backhaul link. The receiving network node can transmit a message label to the wireless terminal. The wireless terminal can identify a stored message that corresponds to the received message label, and send the corresponding message to the receiving network node. The receiving network node can then transmit the message to its intended destination.

15 Claims, 11 Drawing Sheets

(56) References Cited

U.S. PATENT DOCUMENTS

| | | | |
|---|---|---|---|
| 2010/0260146 A1* | 10/2010 | Lu | H04L 12/4633 |
| | | | 370/331 |
| 2010/0322151 A1* | 12/2010 | Racz | H04W 28/06 |
| | | | 370/328 |
| 2011/0065424 A1 | 3/2011 | Estevez | |
| 2012/0220290 A1* | 8/2012 | Awad | H04M 3/2227 |
| | | | 455/423 |
| 2012/0265822 A1 | 10/2012 | Wang | |
| 2013/0232124 A1 | 9/2013 | Gaither | |
| 2014/0119377 A1* | 5/2014 | Crosta | H04L 45/7453 |
| | | | 370/392 |
| 2014/0334491 A1* | 11/2014 | Pazhayakath | H04L 45/38 |
| | | | 370/392 |
| 2015/0003476 A1* | 1/2015 | Zhang | H04L 69/04 |
| | | | 370/474 |

\* cited by examiner

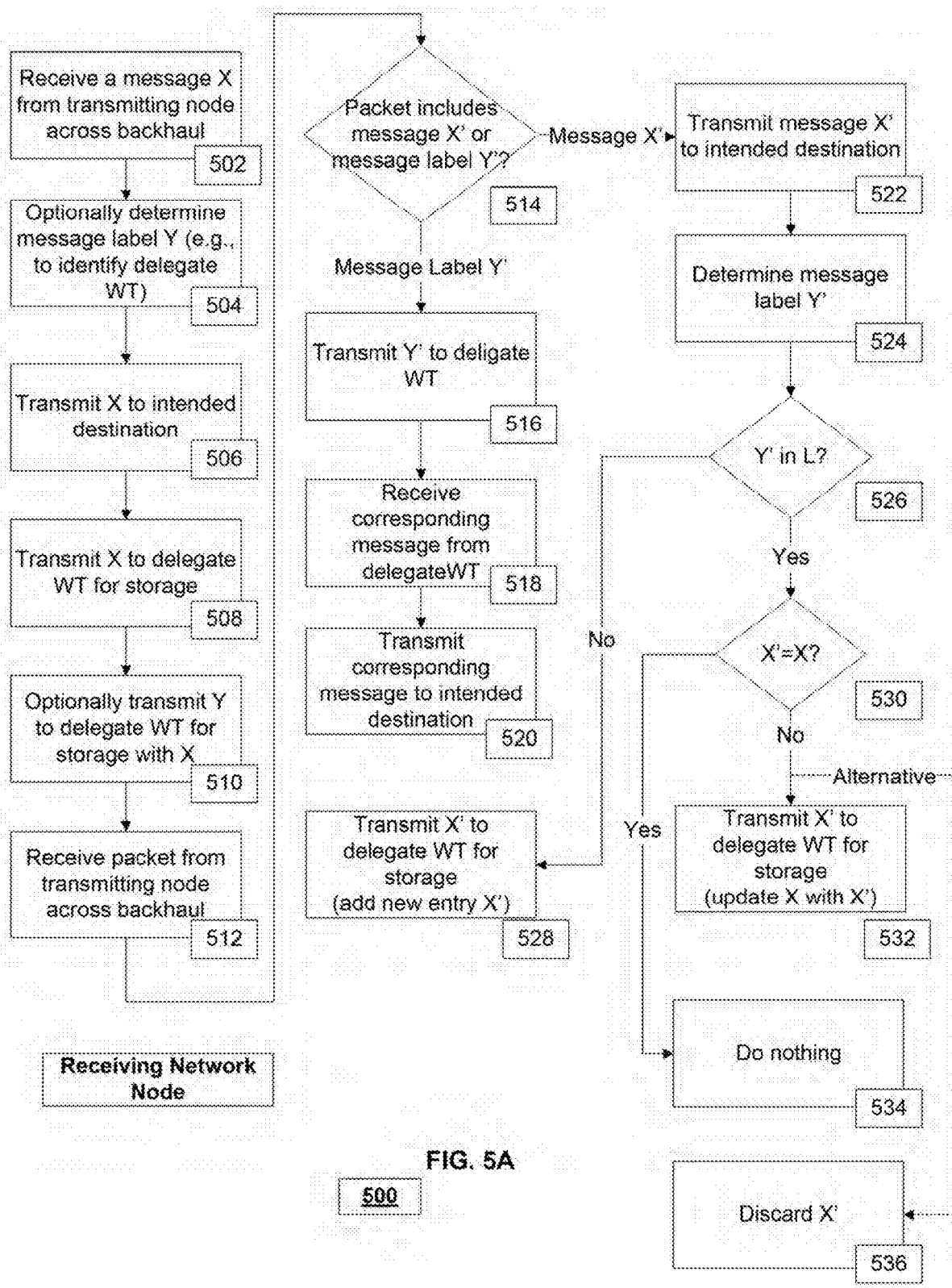

TERMINAL-AIDED BACKHAUL COMPRESSION

FIELD

This disclosure pertains to backhaul compression, and more particularly, to terminal-aided backhaul compression.

BACKGROUND

Wireless networks are increasingly used in a simulcast or broadcast on demand mode, as opposed to a one off unicast between two end users or a server and an end user. The simulcast or broadcast on demand may be done for a variety of purposes, ranging from scheduled newscasts, to entertainment, to education, to machine communication. In addition, the end users want the information, or are available to receive it, at different times. As a result, the backhaul link may end up needlessly transmitting the same information over and over.

In general, both nodes on either end of the backhaul link (e.g., a transmitting node on one end and a receiving node on the other) maintain the same storage (for messages and for label sets). So both nodes keep increasing in size until they reach $2^K$ (where ^ indicates raised to the power), if all bit combinations are used. The total storage is $(N+K) \times 2^K$ bits. There are dependencies in the choice of N and K. The compression benefit occurs when the transmitting unit sends a label of length K instead of a message of length N. Thus a large ratio N/K is desirable in that sense. At the same time, on average $2^{(N-K)}$ messages map into a single label. In particular, if the mapping is linear in binary space, exactly $2^{(N-K)}$ messages map into each label. If N-K is large, then there are more occurrences of the ambiguous case where the message labels match but the messages do not. In those cases, the transmitting node would have to resend the entire message, relying on scarce backhaul resources.

SUMMARY

The present disclosure distributes some of the receiving node's function onto wireless terminals. The base station delegates some or all of the receiving node storage function to one or more terminals, and recalls messages from them as needed, by communicating on the wireless link. Viewed from the backhaul link, the function of the receiving node is unchanged, and there is no increase in communication on the backhaul link.

Aspects of various embodiments of the present disclosure include methods performed in a user equipment in wireless communication with a network node. The user equipment can include a memory, a transceiver, and a processor for executing instructions stored in the memory. The user equipment can be configured to receive a message label from the network node. The message label can be used to identify a message stored in the memory of the user equipment. The user equipment can then transmit the message to an intended destination.

In certain implementations of the embodiments, the intended destination is another user equipment, and transmitting the message to a destination includes wirelessly transmitting the message to a network node. In some instances of the embodiments, the intended destination is another user equipment, and transmitting the message to a destination includes wirelessly transmitting the message directly to the other user equipment. In some instances of the embodiments, the intended destination is the user equipment itself, and transmitting the message to the destination includes retrieving the message from the memory. When the user equipment is the intended destination, the user equipment can retrieve the message from memory and process the message.

In certain implementations of the embodiments, and prior to the user equipment receiving the message label from the network node, the user equipment can receive the message from the network node. The user equipment can then determine a message label for the message based on a predetermined mapping. The user equipment can then store the message in the memory with the determined message label. In certain instances, identifying, based on the received message label, a message stored in a memory of the user equipment may include comparing the received message label received from the network node to the determined message label determined at the user equipment and stored in the memory of the user equipment. The user equipment can determine that the received message label is the same as the determined message label. Transmitting the message to an intended destination can include transmitting the message stored in the memory of the user equipment associated with the determined message label to the intended destination.

In some instances of the embodiments, the message from the network node may include eavesdropping on transmissions between the network node and another user equipment.

Aspects of the embodiments include a method performed at a network node of a wireless communications network. The network node can include a memory, a transceiver, and a processor for executing instructions stored on the memory. The network node can be configured to receive a message label from a transmitting network node across a backhaul link. The network node can determine that the message label does not coincide with a message stored at the network node. The network node can transmit the message label to a designated user equipment. The network node can then receive a message associated with the message label from the designated user equipment and transmit the message to an intended user equipment.

In some implementations of the embodiments, the network node can receive an indication that the designated user equipment has left the wireless communications network. The network node can then transmit an indication that the designated user equipment has left the wireless communications network across the backhaul link to the transmitting network node. The transmitting network node can delete any saved messages and corresponding message labels. The transmitting or the receiving node can designate a new user equipment for storing messages. In some implementations of the embodiments, the network node can receive an indication from the transmitting network node of a new designated user equipment, wherein the network node is in wireless communication with the new designated user equipment. In some implementations of the embodiments, the network node can receive a message from the transmitting network node across the backhaul link and wirelessly transmit the message to the new designated user equipment.

In some implementations of the embodiments, receiving a message label from a transmitting network node across a backhaul link can include receiving a first message label. Transmitting the message label to a designated user equipment may include transmitting the first message label to a first designated user equipment. The network node may also receive a second message label from the transmitting network node via the backhaul link, the second message label different from the first message label and transmit the second message label to a second user equipment.

Prior to receiving the message label from the transmitting network node via the backhaul link, the network node can receive a message from the transmitting network node via the backhaul link, the message intended for a target user equipment in wireless communication with the network node. The network node can transmit the message to the target user equipment and to the designated user equipment.

Aspects of the present disclosure are directed to a network node of a wireless communications network. The network node includes a memory for storing data, a transceiver for sending and receiving data across a wireless link, and a processor for executing instructions stored on the memory. The network node can be configured to receive a message and determine a message label for the message. The network node can then determine that the determined message label is the same as a stored message label that is stored in a memory of the transmitting network node. The network node can compare the received message to a stored message associated with the stored message label. If the received message is the same as the stored message, then transmit the determined message label to a second network node via a backhaul link. If the received message is different than the stored message, then transmit the received message to the second network node via the backhaul link, and store the received message with the determined message label.

In some instances, the network node can receive an indication from the second base station that a first designated user equipment is no longer connected to the second base station. The network node can also transmit an identification of a new designated user equipment to the second network node. In some implementations, the network node can erase one or more messages and message labels stored in the memory of the network node that coincide with messages and message labels stored in the first designated user equipment.

Advantages of the above embodiments are readily apparent to those of ordinary skill in the art. For example, embodiments of the present disclosure provide for backhaul compression, while the storage requirement on the base station is eased (by distributing storage of messages onto terminals).

BRIEF DESCRIPTION OF THE DRAWINGS

FIG. 5A is a process flow diagram for a receiving network node for backhaul compression in accordance with embodiments of the present disclosure.

DETAILED DESCRIPTION

Figure 1:
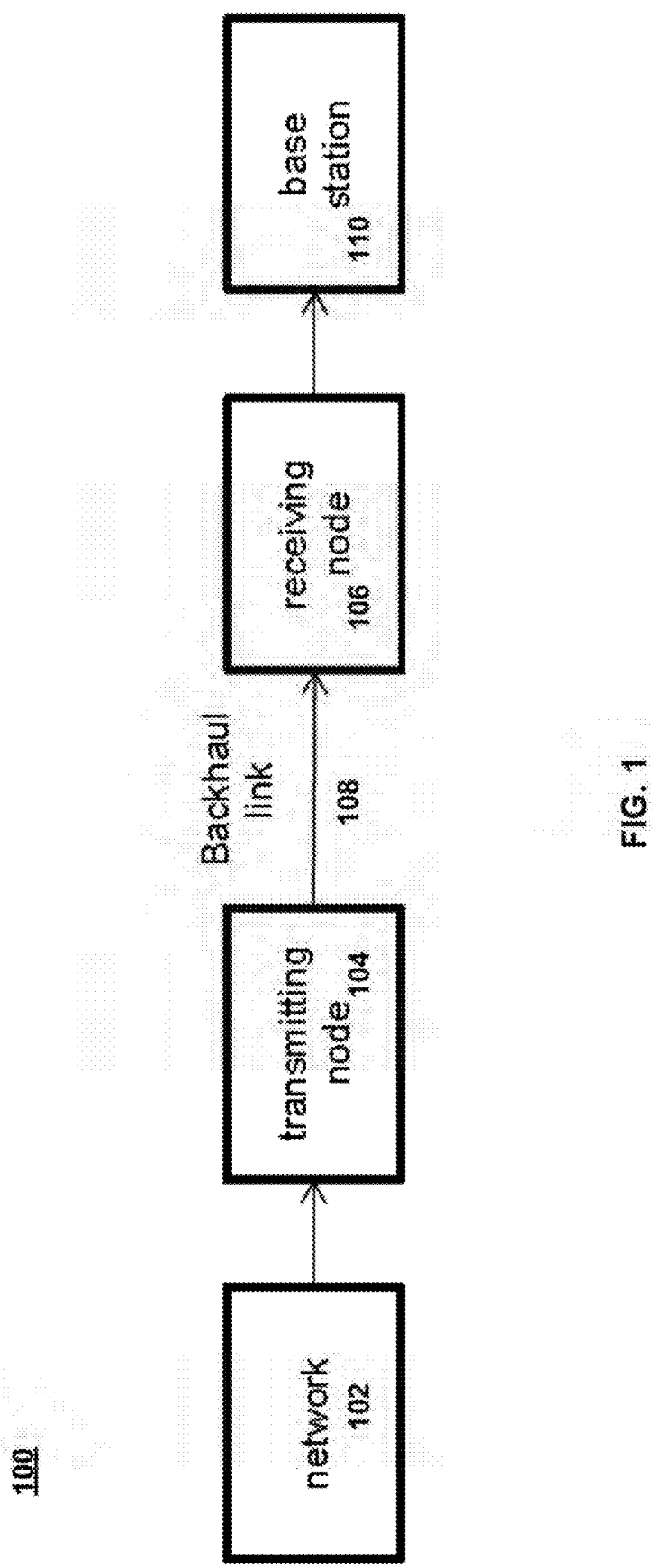
FIG. 1 is a schematic block diagram of network nodes configured for backhaul compression.

Backhaul can be a scarce resource. Backhaul resources can be conserved with a technique known as backhaul compression, which requires two additional nodes, one on the network side (a transmitting network node) and one on the base station side (a receiving network node). FIG. 1 is a schematic block diagram 100 of network nodes configured for backhaul compression. FIG. 1 shows a transmitting network node 104 in communication with the network 102. The network 102 can be a core network or evolved packet core or other core network. The transmitting network node 104 is in communication with a receiving network node 106 via a backhaul link 108. In FIG. 1, the receiving network node 106 is in communication with a base station 110 (though the receiving network node 106 itself may be a base station, or a part of a base station—the terms are not necessarily mutually exclusive in this disclosure). Each of these nodes (including the base station 110) should have large storage capacity, which can be a problem at the base station 110. Thus, for backhaul compression, which uses increasing amounts of storage for increasing amounts of transmitted data, moving some of the storage to wireless terminals relieves the base station 110 of storage demands.

Figure 2:
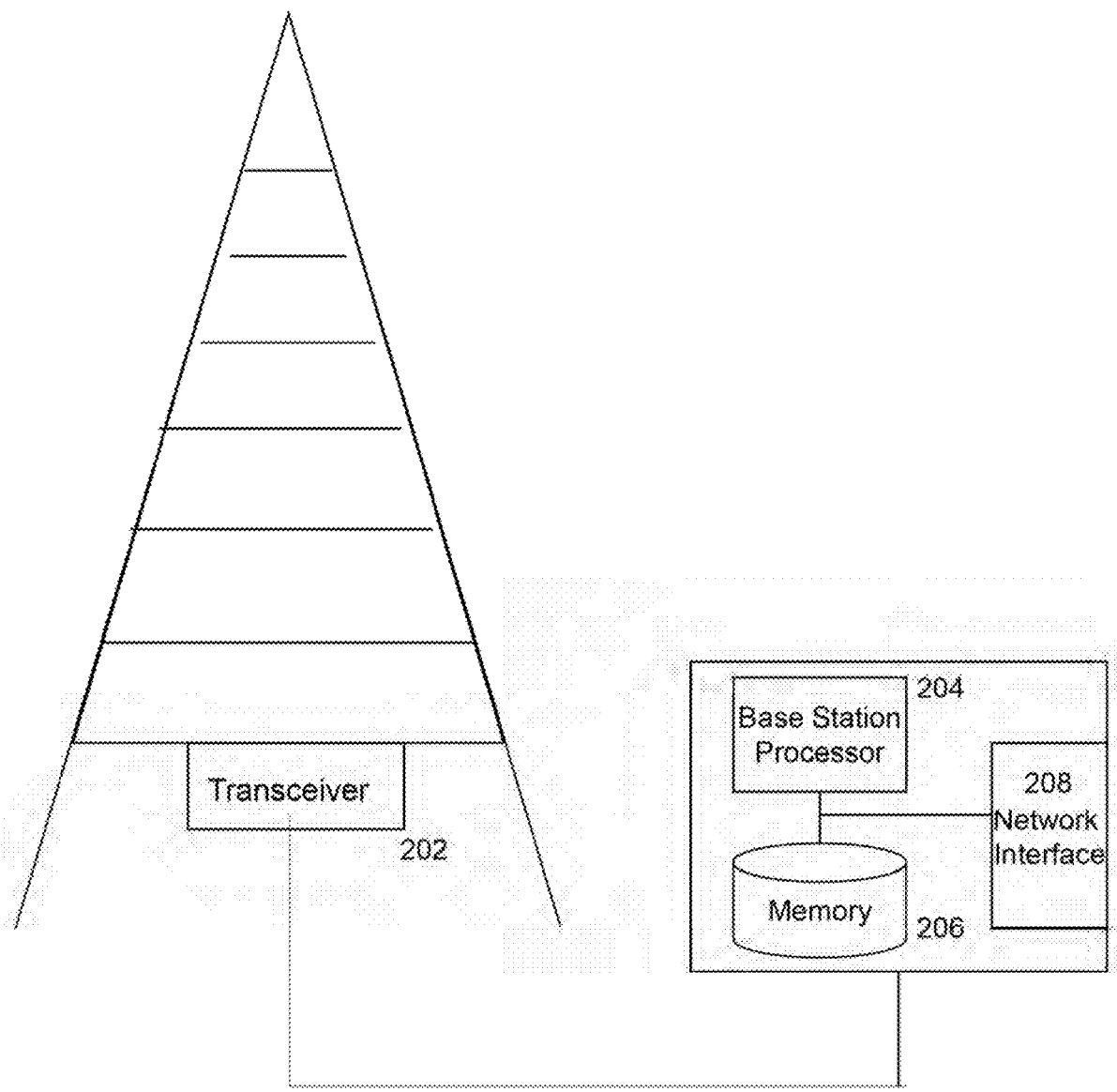
FIG. 2 is a schematic block diagram of an example network node in accordance with embodiments of the present disclosure.

FIG. 2 is a schematic block diagram of an example network node 200 in accordance with embodiments of the present disclosure. The example network node 200 can be a transmitting network node 104 or a receiving network node 106 described above in conjunction with FIG. 1. The receiving network node described in FIGS. 3-10 may also be consistent with the network node in FIG. 2. The example network node 200 includes a transceiver 202, a processor 204, a memory 206, and a network interface 208. Examples of network node 200 include an eNodeB, a base station, etc.

In some embodiments, transceiver 202 facilitates transmitting wireless signals to and receiving wireless signals from a wireless communication device (e.g., via an antenna). Processor 204 executes instructions to provide some or all of the functionality described above. Memory 206 stores the instructions executed by processor 204 as well as messages and message labels and message label sets. Network interface 208 communicates signals to the core network 102, including backend network components, such as a gateway, switch, router, Internet, Public Switched Telephone Network (PSTN), etc.

Processor 204 may comprise any suitable combination of hardware and software implemented in one or more modules to execute instructions and manipulate data to perform some or all of the described functions of network node 200. In some embodiments, processor 520 may include, for example, one or more computers, one or more central processing units (CPUs), one or more microprocessors, one or more applications, and/or other logic.

Memory 206 is generally operable to store instructions, such as a computer program, software, an application comprising one or more of logic, rules, algorithms, code, tables, etc. and/or other instructions capable of being executed by a processor. Examples of memory 206 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

The network interface 208 is communicatively coupled to processor 520 and may refer to any suitable device operable to receive input for network node 200, send output from network node 200, perform suitable processing of the input or output or both, communicate to other devices, or any combination of the preceding. Network interface 208 may include appropriate hardware (e.g., port, modem, network interface card, etc.) and software, including protocol conversion and data processing capabilities, to communicate through a network.

Figure 3:
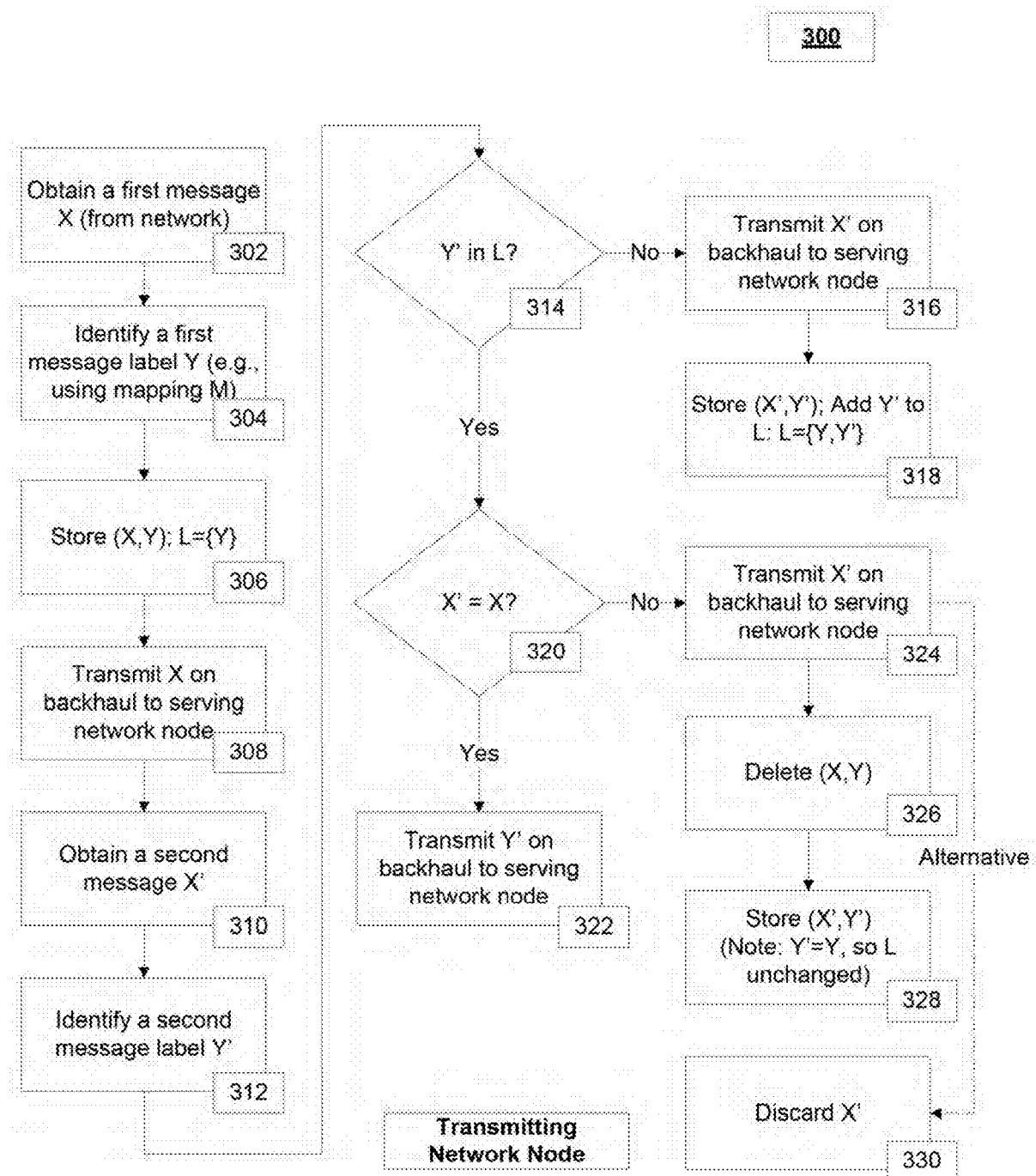
FIG. 3 is a process flow diagram for a transmitting network node for backhaul compression in accordance with embodiments of the present disclosure.

FIG. 3 is a process flow diagram 300 for a transmitting network node for backhaul compression in accordance with embodiments of the present disclosure. At the transmitting network node, a first block of information X of length N is obtained and seen at the transmitting network node for the first time (302). A message label Y is identified for the message X using a mapping M (304). The message X can be represented by the shorter message label Y of length K (i.e., N>K bits) using the mapping M. In this disclosure, X is referred to as the message and Y as the message label, and the pair is referred to as (X,Y). (A similar nomenclature is used for subsequent messages and message labels, but with a prime indicator (X', Y').) The message label Y can be identified by performing a mapping using M or by receiving the message label Y with the message X. It is understood throughout this disclosure that network nodes and user equipment can differentiate between messages and message labels.

The transmitting network node stores (X,Y), and also stores the message label Y as part of a message label set L (306). Storing both (X,Y) and Y in L results in the conservation of computational resources. The alternative would be to store the messages X only, and repeatedly compute the message labels for X as needed, and identify the unique message labels to recreate the set L, but that is generally computationally wasteful. Additionally, the messages X can be stored separately, and the set L of labels Y separately, and add pointers to identify which X goes with which Y, but that is equivalent to storing the pairs (X,Y).

Before the first transmission, L is empty; after the first transmission L contains Y (i.e., L={Y}). The transmitting network node sends X on the backhaul link to a receiving network node (308).

The transmitting network node can receive another message X' (310). A second message label Y' can be identified (312). The transmitting network node can determine whether the second message label Y' is in the message label set L (314). If Y' is not in L, then the transmitting network node transmits the message X' to the receiving network node on the backhaul link (316). The transmitting network node can store (X', Y') and add Y' to the message label set L (i.e., now L=(Y, Y')).

If the transmitting network node determines that the second message label Y' is in L (i.e., Y' is in L if Y' is the same as another message label in L (Y'=Y)), then the transmitting network node can determine whether the message X' is the same as the previous message X (320) corresponding to Y. If the messages are the same (X'=X), then the transmitting network node can send the message label Y' to the receiving node on the backhaul link (322). If the messages are not the same (X' is not X), then the transmitting network node transmits the second message X' to the receiving network node on the backhaul link (324). In some embodiments, the transmitting network node can update its storage by deleting (X,Y) (326), and storing the new message X' with the second message label Y' (X', Y') (328). The message label set would remain unchanged because in this chain, the message label Y' is either already in the set L or is the same as a message label in the set L (i.e., L={Y, Y'} or L={Y}={Y'}).

The case when the message labels match but the messages do not (i.e., Y=Y', but X≠X') highlights the ambiguity of the label representation. There are in this instance messages X and X' with the same label Y. It does not help to store both (X,Y) and (X',Y) because information retrieval is guided by the message label. Storing the newer message X' assumes that newer messages are more likely matches to the intended transmissions. In some embodiments, the transmitting node can keep the first message X and not store the second message X'. The transmitting node and the receiving node use the same protocol for which message to keep when labels match, in order to stay synchronized. That is, they both keep the second message X', or they both keep the first message X.

The process at the transmitting network node following receiving the second message can be summarized by the following pseudo-code (% represent comments). For the following pseudo-code, it is assumed that the transmitting network node has received a message X, identified Y, and stored (X, Y) and L={Y}:

```
- L = {Y}
- Receive X'
- Compute the label Y'
- If Y' is not in L
    o send X'
    o store (X',Y')
    o include Y' in L % L = {Y, Y'}
- else % Y' in L
    o compare X' to X
    o If X' ≠ X % Same label different messages
        • send X'
        • remove (X,Y) % update X OR alternatively discard X'
        • store (X',Y') % L unchanged because Y' in L
    o else % X' = X
        • send Y'
    o end
- end
```

Pseudo-Code for Actions Taken by Transmitting Network Node after Receiving X'.

Note that after the first transmission, L={Y}, so that Y' not in the set L means that Y'≠Y. Then the transmitting network node stores the pan (X',Y') in addition to the old pan (X,Y), and Y' is added to the set L:L={Y,Y'}.

Figure 4:
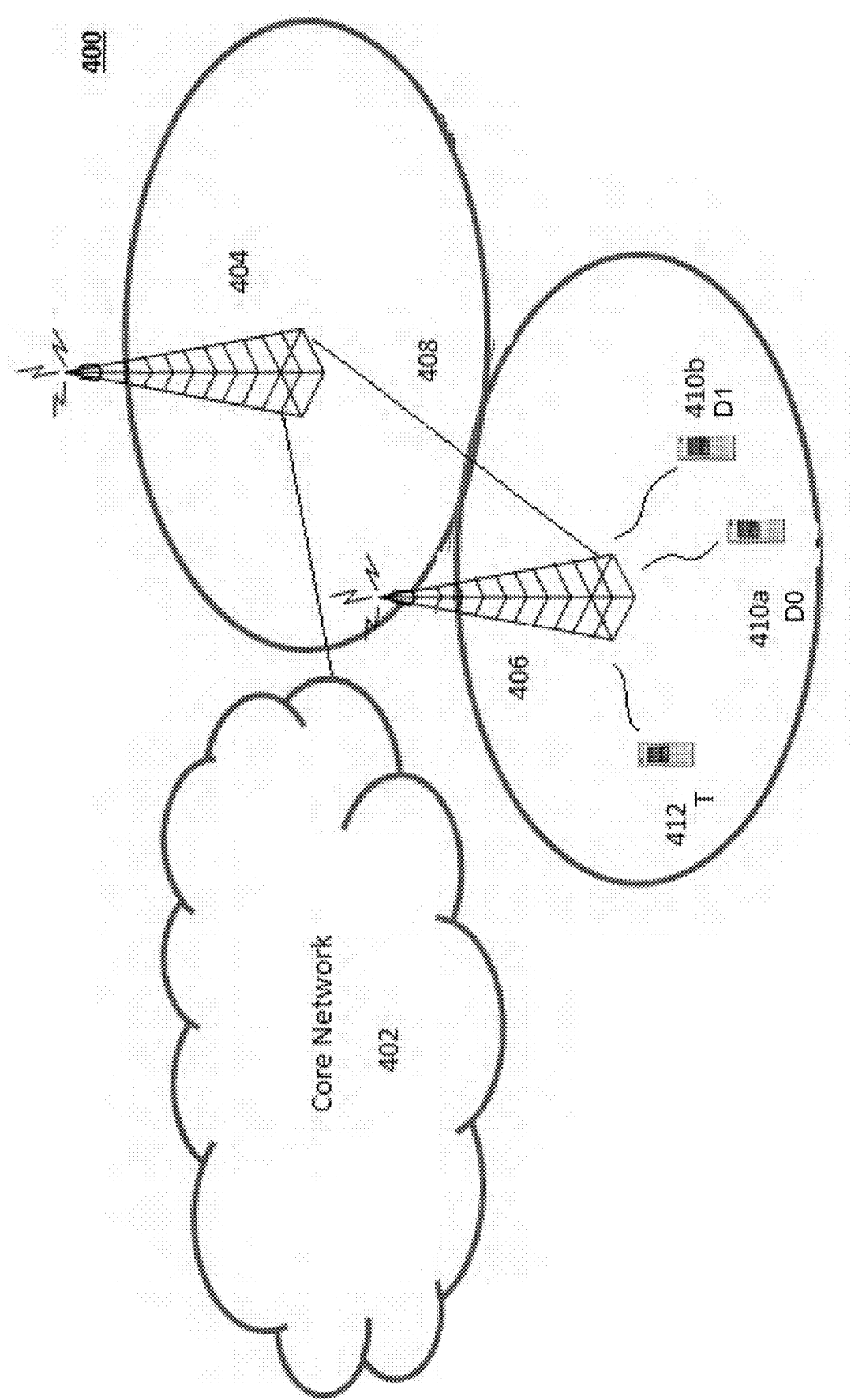
FIG. 4 is a schematic block diagram of network nodes and user equipment configured for terminal-aided backhaul compression in accordance with embodiments of the present disclosure.

The message or message label is transmitted from the transmitting network node across the backhaul link to a receiving network node. The transmission pathways are shown in FIG. 4, including the backhaul link and the wireless pathways between the receiving network node and the wireless terminals. FIG. 4 is a schematic block diagram of network nodes and user equipment configured for terminal-aided backhaul compression in accordance with embodiments of the present disclosure. In FIG. 4, the transmitting network node 404 is in communication with the core network 402. It is also in communication with a receiving network node 406 via a backhaul link. The receiving network node is in wireless communication with one or more wireless terminals. In the example shown in FIG. 4, the receiving network node 406 is in wireless communication with wireless terminals 410a and 410b (referred to as delegate wireless terminals D0 and D1, respectively) and wireless terminal 412 (referred to as target wireless terminal T). (The delegate wireless terminal may be referred to generally as D, particularly when generalizing the embodiments to a single delegate wireless terminal scenario.) FIG. 4 shows the receiving network node 406 in communication with two delegate terminals D0 410a and D1 410b. It is understood, however, that there may be only one delegate terminal, D, or there may be more than two (Dn). Two delegate wireless terminals are shown for illustrative purposes. Likewise, FIG. 4 shows receiving network node 406 in wireless communication with one target wireless terminal 412, but it is understood that more than one target wireless terminal may also be in communication with the receiving network node 406.

The core network 402 may be the same or similar to the core network described in FIG. 1. The transmitting and receiving network nodes 404 and 406 respectively can also be a network node as described by FIG. 1 and FIG. 2. Likewise, the transmitting network node 404 performs the same or similar operations as described in FIG. 3 above. The receiving node operations for terminal-aided backhaul compression are described below.

At the outset, it is assumed that the receiving node can distinguish between messages and message labels. The distinction may be communicated explicitly with additional signaling, or implicitly by checking the length of the block.

FIG. 5A is a process flow diagram 500 for a receiving network node for backhaul compression in accordance with embodiments of the present disclosure. The receiving network node receives a message X from the backhaul link (502). At the receiving network node, a message label Y can be optionally identified from X using the same mapping M (504), similar to that described before in FIG. 3. The receiving network node can use the determined message label Y to identify a delegate wireless terminal to aid in backhaul compression and storage of messages. The receiving network node transmits the message X to an intended destination (e.g., across a wireless link) (506). For example, the receiving network node can transmit the message X to a wireless terminal or to another base station. Additionally, the receiving network node transmits the message X to a delegate wireless terminal for storage (508). In some embodiments, the delegate wireless terminal can eavesdrop on transmissions from the receiving network node, as explained in more detail below. In some embodiments, the receiving network node can also transmit the message label Y with the message X to the delegate wireless terminal (510).

In one example embodiment, the mapping M maps an N bit message X into a K bit label Y, where K<N. A simple example of such a mapping is a linear parity check function, for example a CRC, which uses a linear function over the binary field to map a message X to a parity check field Y. Then the parity check field Y plays the role of the label in our setting. More generally, one can use any mapping from N bits to K bits as the mapping M. In the general case, we would need a table of size $2^N$, listing all N bit messages and their corresponding K bit labels. On average, $2^{(N-K)}$ messages share the same label. For the linear case, exactly $2^{(N-K)}$ messages share the same label. It is important to keep in mind that knowledge of a label Y does not uniquely identify the message X.

The receiving network node can then receive a packet from the transmitting network node via the backhaul link (512). The receiving node can distinguish between a message X' and a message label Y' (514). If the packet includes a message label Y', the message label Y' is transmitted to the delegate wireless terminal (516). The wireless terminal retrieves a corresponding message X' stored in memory and transmits the message X' to the receiving network node (wireless terminal functionality is described more below). The receiving network node receives the message X' from the delegate wireless terminal (518). The receiving network node can then transmit the message X' to an intended destination (520). Note that with respect to the mapping function M, it is a many to one function from message X to message label Y, so observing Y is not enough to reconstruct X. Therefore, upon receiving a message label Y, a message X is retrieved from storage (i.e., from the delegate wireless terminal) to overcome this ambiguity. Storing the message X at the wireless terminal also relieves the receiving network node from increasing storage requirements. In some embodiments, the delegate wireless terminal can eavesdrop on transmissions from the receiving network node, and can store messages transmitted to other wireless terminals. In such cases, the receiving network node may not need to determine whether the message label Y' is in the set L before transmitting the message X' to the delegate wireless terminal.

If the receiving network node receives a packet that includes a message X', then it can transmit the message X' to an intended destination (522). In some embodiments, the receiving network node can take steps to ensure that the messages stored are synchronized with messages transmitted by the transmitting network node. Towards that goal, in some embodiments, the receiving network node identifies a message label Y' for the message X' based on the mapping M (524). The serving network node can determine whether the message label Y' is in the message label set L (Y' in L?) (526). If the message label Y' is not in L, then the receiving network node can transmit the message X' to a delegate wireless terminal for storage (528) (i.e., the delegate wireless terminal stores a new message X').

Continuing from (526), if the message label Y' is in the message label set L (meaning that the receiving network node has received that label before), the receiving network node can determine whether the received message X' is the same as a previously received message X (530). The receiving network node can make the determination by, for example, transmitting Y' to a delegate wireless terminal and subsequently receiving a corresponding message X. The receiving node can then compare the received messages X and X'. If the message X and X' are the same, then there is no need to do anything (534).

When the message labels match but the messages do not at the receiving node, the older message X can be chosen to be removed, and the newer X' is stored instead. That is, the receiving node can transmit the newer message X' to the delegate wireless terminal for storage by updating the older message X with the newer message X'. This choice enables the receiving network node to remain in sync with the transmitting network node: that is, both entities on either side of the backhaul link maintain the same storage (and label set).

In some use cases of backhaul compression, recent information is more likely to be re-transmitted by the network. For example, a newscast may be requested many times within a short window of time, and then become stale when the next newscast is available. This example use case justifies the choice to keep the newer message in case two messages have the same label, as it increases the likelihood of future successful message matches.

Additionally, in many cases of backhaul compression, information is local, in the sense that it is of interest within a small geographical area. Thus, terminals in the same cell tend to receive the same message, thereby increasing the potential for compression gain.

In other embodiments, there is no preference given to newer messages. That is, when Y' is in L ({Y'}={Y}), but X' is not equal to X, the newer message X' is discarded and the older message X is kept at both the transmitting node and the receiving node (536). This alternative gives a slight advantage in complexity. Other embodiments are also possible, as long as the transmitting node and the receiving node take the same steps and remain synchronized. The storage requirement of the receiving function at the base station is greatly reduced, and shifted to the delegate terminal. The receiving function at the base station is mostly limited to routing information from and to the delegate terminal and the desired terminal.

Figure 5B:
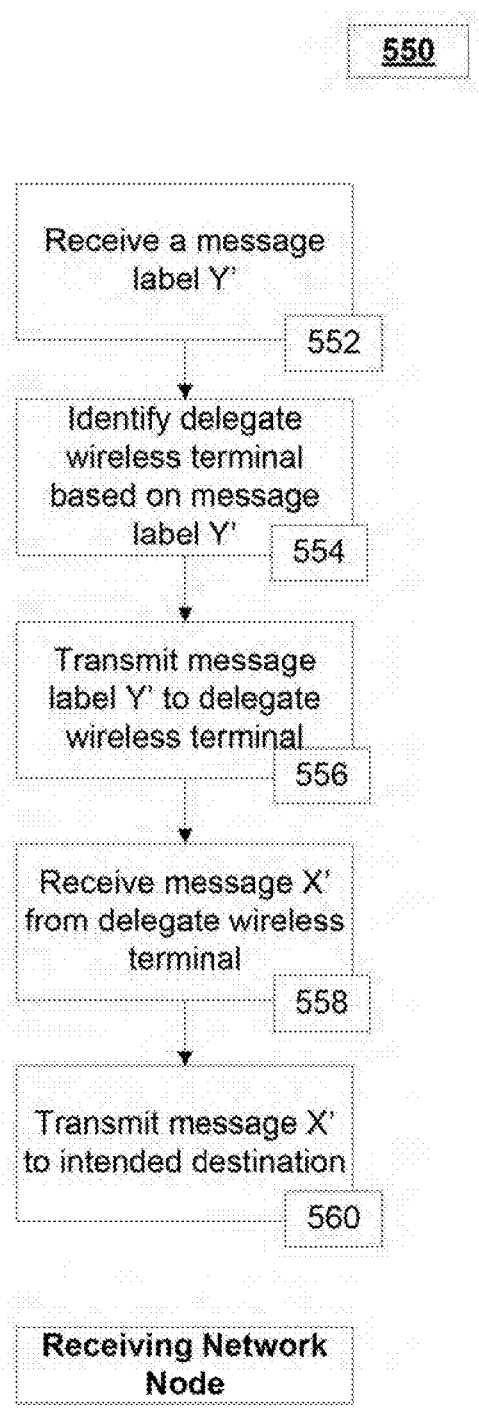
FIG. 5B is a process flow diagram for a receiving network node for backhaul compression in accordance with embodiments of the present disclosure.

FIG. 5B is a process flow diagram 550 for a receiving network node for backhaul compression in accordance with embodiments of the present disclosure. A receiving network node can receive a message label Y' from a transmitting network node across a backhaul link (552). In some embodiments, the receiving network node can identify a delegate wireless terminal based on the message label Y' (554). For example, with two delegate terminals D0 and D1, the receiving network node can distribute message labels whose first bit is a 0 to D0 and message labels whose first bit is a 1 to D1.

More specifically, if the packet at the receiving network node contains a message X, then the message X is sent on the wireless link to its intended destination (e.g., a terminal T). Also, the receiving network node can compute the message label Y for message X. If the first bit of the message label Y is a 0, then the base station sends the message X to D0. If the first bit is a 1, then the receiving network node sends the message to D1. An advantage here is that if D0 receives a message label Y, D0 knows that the first bit of Y is 0, so D0 does not have to store that first bit. Similarly for D1: if D1 receives a message label Y, D1 knows that the first bit of Y is 1, so D1 does not have to store that first bit.

If the packet arriving at the receiving network node contains a label Y and the first bit of Y is a 0 (1), then the receiving network node transmits Y on the wireless downlink to D0 (D1), which identifies X and transmits it to the base station on the wireless uplink. The receiving network node in turn transmits X to T via the base station on the wireless downlink.

The receiving node function is effectively distributed over D0 and D1, with each maintaining half the storage and handling half the message retrievals.

This approach generalizes naturally to distributed delegation. For instance, four delegate terminals D00, D01, D10 and D11 can share the load, depending on the first 2 bits in the label. The receiving node function is effectively distributed over the four delegates, with each maintaining a quarter of the storage and handling a quarter of the message retrievals. Note that the first 2 bits of the label need not be stored in this case.

The step (554) can also be performed in conjunction with the operations of FIG. 5A.

In other embodiments, the receiving network node knows the delegate wireless terminal(s) without having to identify it using the message label.

The receiving node can then transmit the message label Y' to the delegate wireless terminal (556). The receiving node would then receive a message X' from the delegate wireless terminal (558), and transmit the received message X' to its intended destination (560) (e.g., across a wireless link to a target wireless terminal T).

Figure 6:
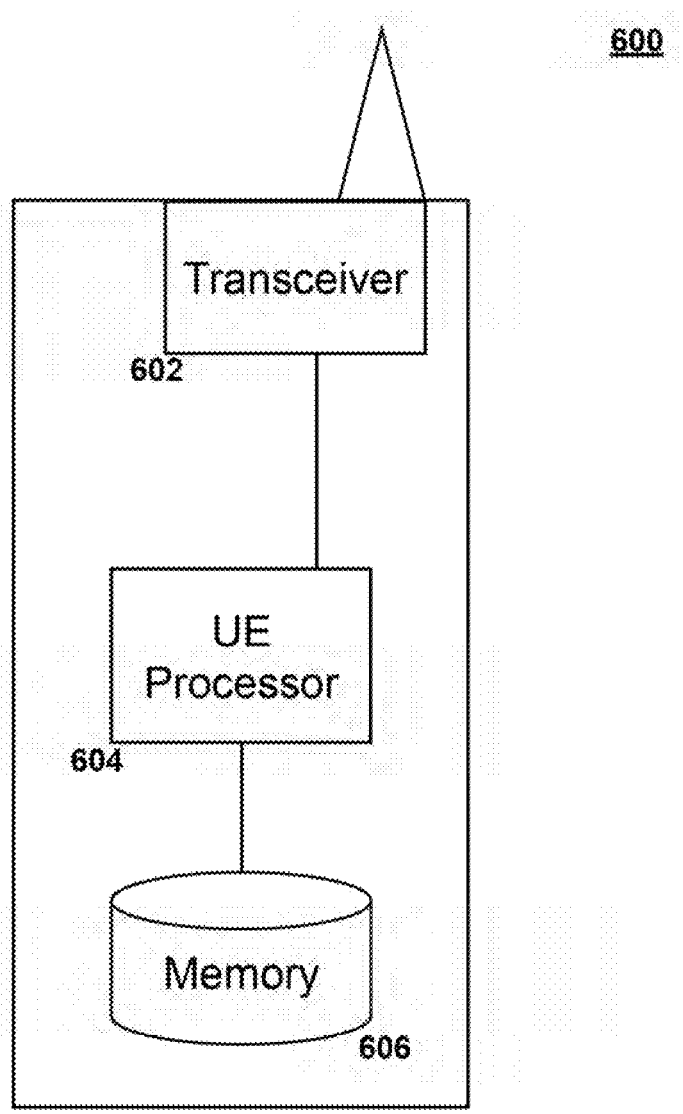
FIG. 6 is a schematic block diagram of a wireless terminal configured for terminal-aided backhaul compression in accordance with embodiments of the present disclosure.

FIG. 6 is a block diagram illustrating embodiments of a wireless terminal 600. Examples of wireless terminal 600 include a mobile phone, a smart phone, a PDA (Personal Digital Assistant), a portable computer (e.g., laptop, tablet), a machine type communication (MTC) device, or other device that can engage in wireless communication. A wireless terminal 600 may also be referred to as user equipment (UE), a station (STA), or a wireless communications device, or other term. Wireless terminal 600 includes transceiver 602, processor 604, and memory 606. In some embodiments, transceiver 602 facilitates transmitting wireless signals to and receiving wireless signals from an network node (e.g., via an antenna), processor 604 executes instructions to provide some or all of the functionality described above as being provided by wireless communication devices, and memory 606 stores the instructions executed by processor 604.

Processor 604 may include any suitable combination of hardware and software implemented in one or more modules to execute instructions and manipulate data to perform some or all of the described functions of wireless communication device 600. In some embodiments, processor 604 may include, for example, one or more computers, one or more central processing units (CPUs), one or more microprocessors, one or more applications, and/or other logic. The processor 604 can execute instructions stored in memory 606 and using data stored in memory 606. The processor 604 can be configured execute instructions to store received messages in memory 606, identify messages based on message labels, make comparisons of messages and message labels, as well as other instructions. Additionally, the processor 606 can execute instructions pertaining to wireless communication with the network node, including connection set-up and tear-down, processing messages upon receipt and for transmission, handover, direct device-to-device communications, as well as other operations known to those of skill in the art. Additionally, processor 604 can be configured to distinguish between a message and a message label, for example, explicitly with additional signaling, or implicitly by checking the length (of bits) of the received message block.

Memory 606 is generally operable to store instructions, such as a computer program, software, an application comprising one or more of logic, rules, algorithms, code, tables, etc. and/or other instructions capable of being executed by a processor. Examples of memory 606 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information. The memory 606 can store messages received wirelessly from a network node. The messages can be stored in tables or databases with corresponding message labels (e.g., (X,Y), (X',Y'), etc.). Additionally, message labels can be stored in tables or databases individually (e.g., as message set L).

Alternative embodiments of wireless terminal 600 may include additional components beyond those shown in FIG. 6 that may be responsible for providing certain aspects of the wireless communication device's functionality, including any of the functionality described above and/or any additional functionality (including any functionality necessary to support the solution described above).

Figure 7A:
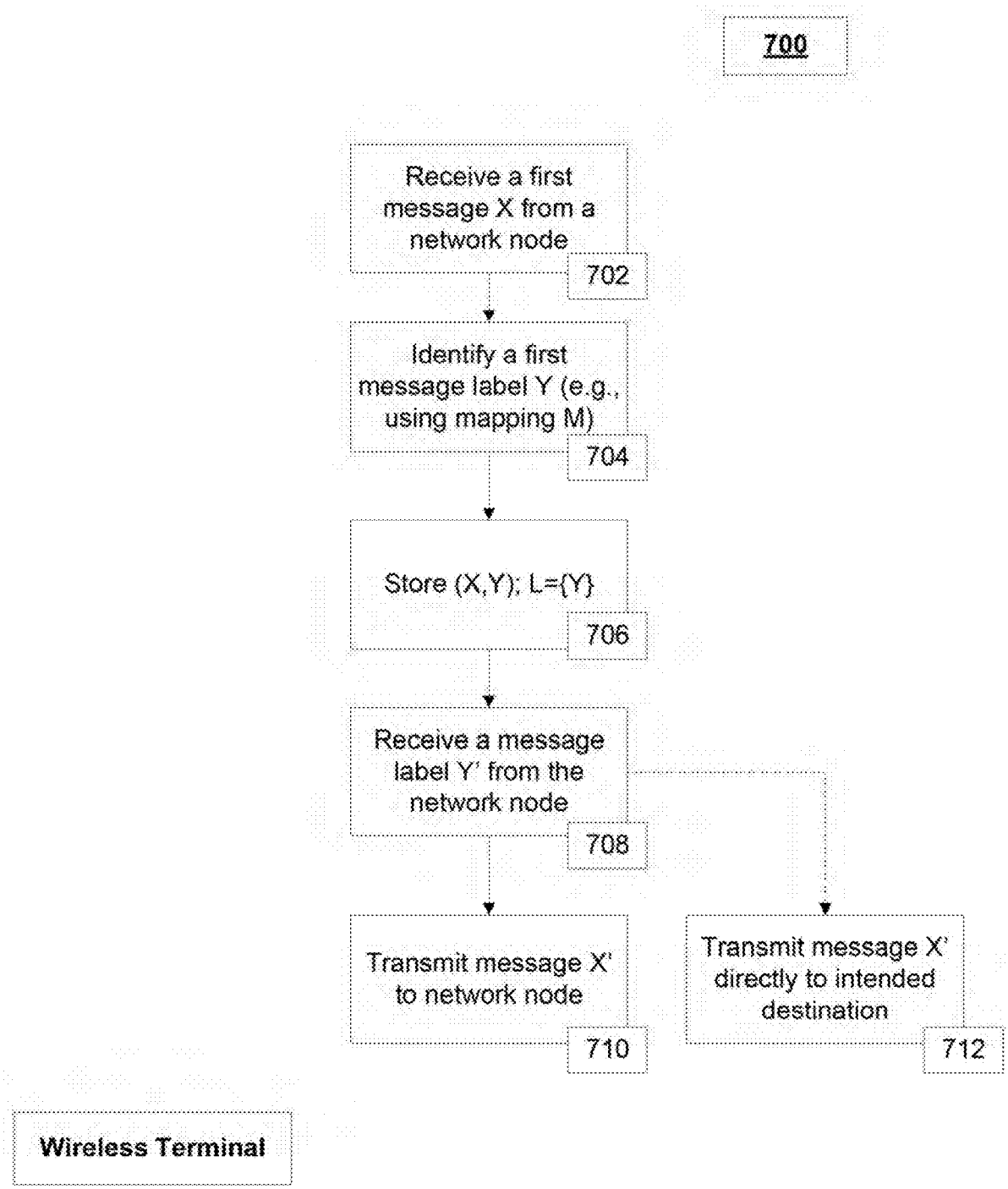
FIG. 7A is a process flow diagram for a wireless terminal for terminal-aided backhaul compression in accordance with embodiments of the present disclosure.

FIG. 7A is a process flow diagram 700 for a wireless terminal for terminal-aided backhaul compression in accordance with embodiments of the present disclosure. At the outset, it can be assumed that a number of terminals are attached to a network node, and that some are willing to participate in the task. The cooperation of the wireless terminals to participate in terminal-aided backhaul compression relies on the wireless terminals to set aside storage and computation resources. The wireless terminal can also communicate with the network node for retrieving stored messages. These additional tasks presumably have an impact on battery life, resource availability for other tasks in the terminals, etc. The cooperation of the terminals may be compensated with lower operator charges, better service priority, or simply mandated by the operator.

A wireless terminal receives a first message X from a network node across a wireless link (702). The wireless terminal can identify a message label Y based on the message X using a mapping M (704). The wireless terminal can store the message X and message label Y together in memory (as (X,Y)); and store the message label Y as part of a message label set L (L={Y}) (706). These preliminary steps can be done several times based on the memory storage limits agreed upon by the wireless terminal. The memory can store several messages and message labels, and the message label set L can be populated with several values.

The wireless terminal can receive a message label Y' from the network node (708). In some embodiments, upon receiving the message label Y', the wireless terminal can transmit a corresponding message to the receiving network node on the wireless uplink via the base station (710). As described above, the receiving network node receives the stored message and transmits it to its intended destination. Also described above, in some embodiments, the receiving network node had received the same message label from at transmitting network node from across the backhaul link. The use of the message labels, which are presumably smaller in bit size that their corresponding messages, relieves the resource requirements of the backhaul link. Storing messages on the wireless terminals relieves network nodes from increasing storage capacity.

In some embodiments, a delegate wireless terminal (i.e., a wireless terminal designated to store messages) may eavesdrop on the transmission from the network node to the intended terminal T, obviating the need for a second transmission. First consider the case of a single delegate D. When the base station transmits a message X on the wireless downlink to T, then D eavesdrops on the transmission, and receives X. D then maintains the receiving node function as before.

Next consider the case of multiple delegates. For example, revisiting the case of 2 delegates, D0 and D1, both eavesdrop when the base station transmits a message X on the wireless downlink to T. Also both compute the label Y. If Y starts with a 0 (1), then D0 (D1) maintains its part of the receiving node function as before, while D1 (D0) takes no further action.

In embodiments of wireless communication systems, the terminals communicate through the network nodes. Direct terminal to terminal communication is also becoming feasible. Direct terminal-to-terminal communications can be exploited in embodiments of terminal-aided backhaul compression. That is, when a base station receives a packet containing a label Y intended for terminal T, it asks the appropriate terminal, say D0, to retrieve the message X. If T is within range of D0, then T can transmit X to T directly, bypassing the network node.

In the some cases, D0 may transmit X and hope that T can receive it. T can acknowledge to D0 or to the receiving network node. In other cases, T0 tries to determine whether T is within range. To do so, it may listen to a beacon from T, which T is told to transmit by the base station. Alternatively, D0 may transmit a beacon, which T detects and acknowledges to D0, either directly or through the network node.

Figure 7B:
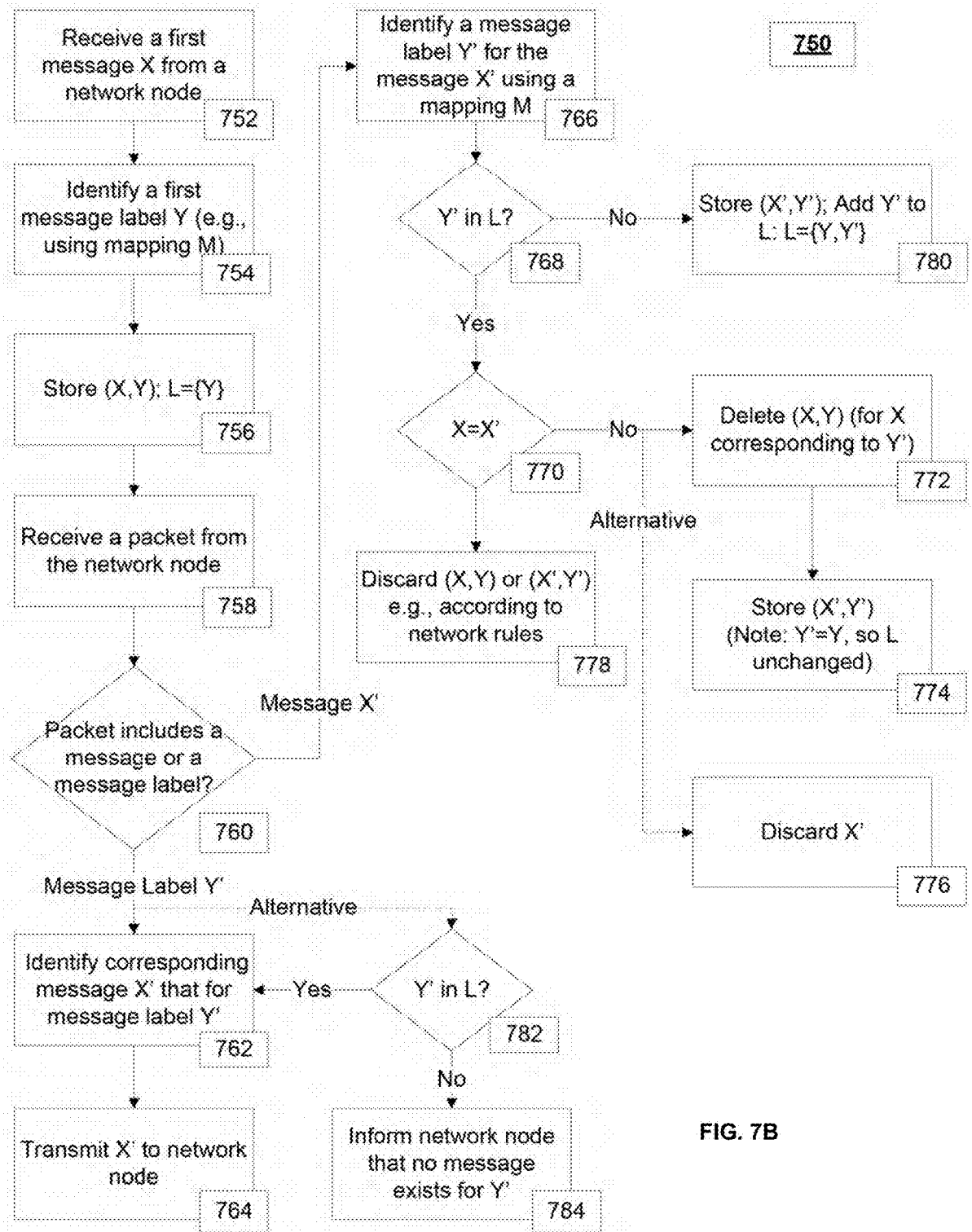
FIG. 7B is a process flow diagram for a wireless terminal for terminal-aided backhaul compression in accordance with embodiments of the present disclosure.

FIG. 7B is a process flow diagram 750 for a wireless terminal for terminal-aided backhaul compression in accordance with embodiments of the present disclosure. The wireless terminal receives a first message X from a network node (752). The receiving node can identify a message label Y based on the message X and a mapping M (754). The receiving node can identify the message label by performing a mapping based on a function M. The receiving node stores the received message X and the corresponding identified message label Y together in memory (e.g., as (X,Y)) and stores the identified message label Y in a message label set L (L={Y}) (756). The steps (752)-(756) can be performed several times and until the wireless terminal reaches its designated storage limits.

The wireless terminal can receive a packet from the network node (758). The wireless terminal can determine whether the packet contains a message label Y' (760). If the packet contains a message label Y', then the wireless terminal can identify a corresponding message X' stored in memory for the message label Y' (762) (e.g., by using the message label Y' as an index for identifying the corresponding message X in a table or database). In some embodiments, the receipt of a message label Y' is sufficient to trigger the wireless terminal to perform the identification of the corresponding X'. In some embodiments, the wireless terminal can perform a comparison of the received message label Y' with the set L of stored message labels to determine whether Y' has been previously received (782). If the wireless terminal determines that it has received the message label Y' before (i.e., Y' in L), then it can proceed to identify the corresponding message X' (762, 764). If after performing the search for Y' in L the wireless terminal determines it has not received Y' previously, then it can inform the receiving network node that it has not received Y' previously, and therefore does not have a corresponding message X' (784).

Returning to the examination of the packet at (760), if the packet contains a message X', the wireless terminal can determine a message label Y' for the message X' based on a mapping M (766). The wireless terminal can then check whether the new message label Y' has previously been received (Y' in L?) (768). If the wireless terminal determines that the new message label Y' was not previously received (Y' not in L), then the wireless terminal can store the new message X' with the new message label Y' together (X',Y'), and store the new message label Y' in the message label set L (L={Y,Y'}) (780).

If the wireless terminal determines that the new message label Y' was received before (L includes Y' or if only one entry for Y, then Y'=Y), the wireless terminal can determine whether the new message X' was previously received (e.g., by checking whether it is the same as a previously received message X) (X=X'?) (770). If the message is new (X≠X'), then the wireless terminal can delete the existing entry for Y' (in this case (X,Y) because Y'=Y) (772). The wireless terminal can then store the message X' with the message label Y' in a table or database (X',Y') (774) (note that in this case, Y'=Y, so L is unchanged). The wireless terminal can store the new message X' and delete the old message X as part of an assumption that the new message X' is more current, thereby maintaining synchronicity with the transmitting network node on the other side of the backhaul link. The wireless terminal could also opt to discard the new message (776).

If the new message X' and the old message X are the same (X=X'), then the wireless terminal can discard either (X,Y) or (X',Y'), e.g., according to rules established by the network (778). Other rules may be based on processor operation costs, memory availability, etc.

Figure 8:
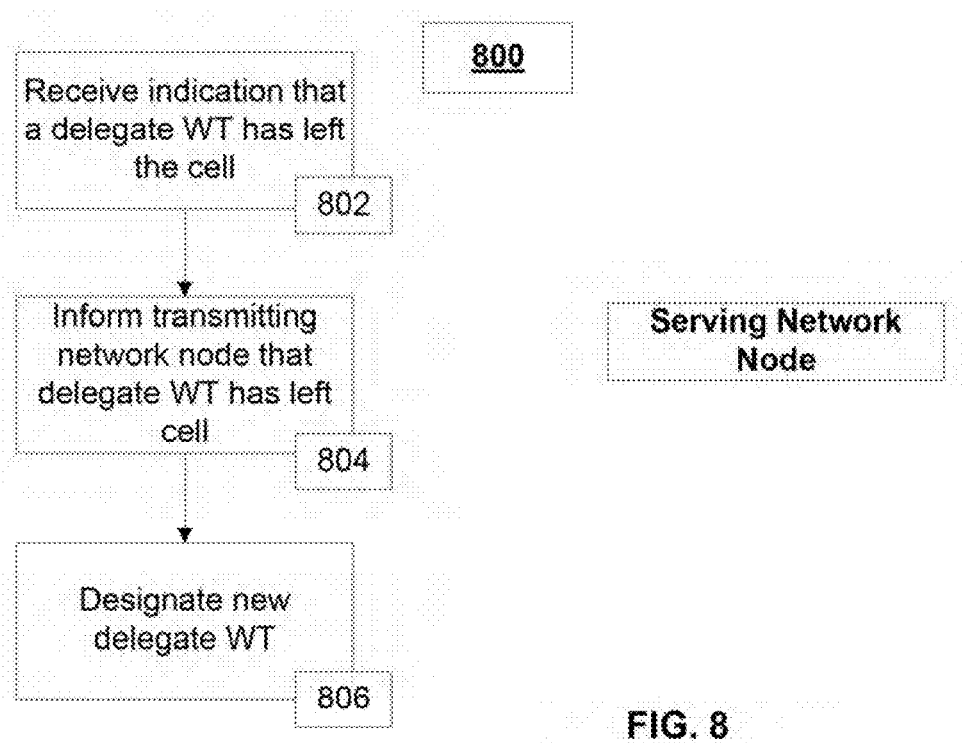
FIG. 8 is a process flow diagram for a receiving network node for identifying a new delegate wireless terminal for some embodiments of terminal-aided backhaul compression.

If the "delegate" wireless terminal D leaves the cell served by the network node (referred to below as the receiving network node), then effectively, the information in the receiving network node is lost. That is, the delegate wireless terminal D is acting as a receiving network node for the purposes of storing messages to aid in backhaul compression (based on the network architecture shown in FIG. 1). The receiving network node is aware that it lost D based on wireless communications protocols. The receiving network node informs the transmitting network node of the loss. The transmitting node wipes out its own storage and starts over with a clean slate. The receiving network node can designate a new wireless terminal as the delegate, and the new delegate wireless terminal also starts with a clean slate. By erasing the messages from memory that were also stored in the delegate wireless terminal, the transmitting network node maintains synchronicity with the new delegate wireless terminal assigned by the receiving network node. This process is illustrated in the following process flow diagrams: FIG. 8 is a process flow diagram 800 for a receiving network node for identifying a new delegate wireless terminal for some embodiments of terminal-aided backhaul compression. The receiving network node receives an indication that the delegate wireless terminal has left the cell (802). This indication can be in accordance with the wireless communications protocols followed by the receiving network node. The receiving network node informs the transmitting network node that the delegate wireless terminal has left the cell (804). The receiving network node can so communicate via the backhaul link or via other interfaces. The receiving network node can then designate a new delegate wireless terminal (806).

Figure 9:
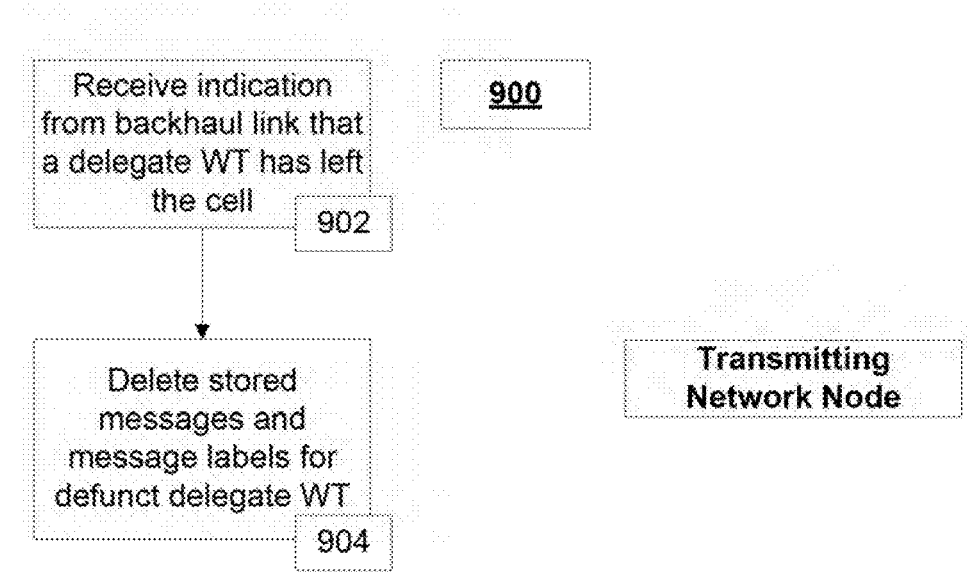
FIG. 9 is process flow diagram for a transmitting network node for synchronizing memory in view of identifying a new delegate wireless terminal for some embodiments of terminal-aided backhaul compression.

FIG. 9 is process flow diagram 900 for a transmitting network node for synchronizing memory in view of identifying a new delegate wireless terminal for some embodiments of terminal-aided backhaul compression. The transmitting network node receives an indication from the receiving network node that the delegate wireless terminal has left the cell (902). Upon receiving the indication, the transmitting network node can delete messages and message labels stored in memory that were also stored in the memory of now-departed delegate wireless terminal (904).

Figure 10:
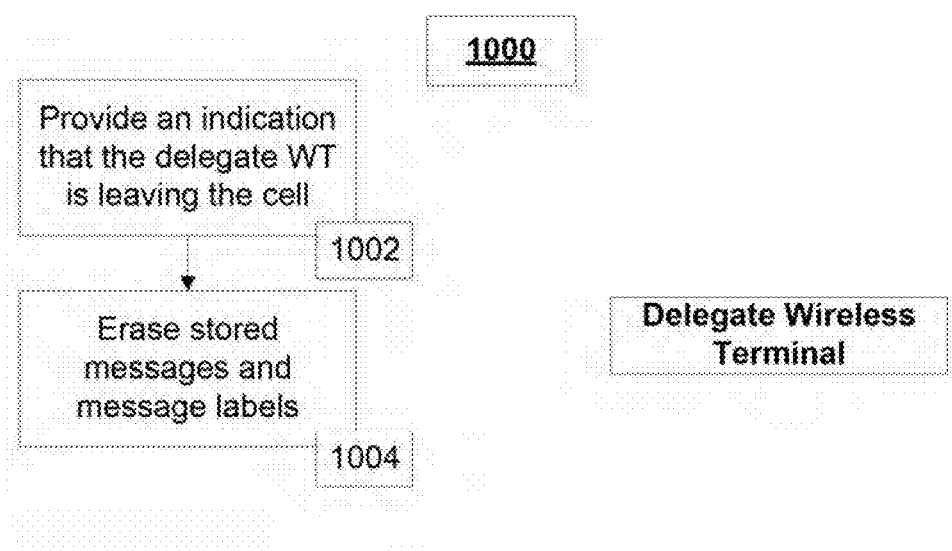
FIG. 10 is a process flow diagram for a wireless terminal for synchronizing memory in view of identifying a new delegate wireless terminal for some embodiments of terminal-aided backhaul compression.

FIG. 10 is a process flow diagram 1000 for a wireless terminal for synchronizing memory in view of identifying a new delegate wireless terminal for some embodiments of terminal-aided backhaul compression. The delegate wireless terminal provides an indication that it is leaving a cell served by a receiving network node (1002). The delegate wireless terminal deletes stored messages and message labels associated with the transmitting network node (1004).

In some embodiments, the intended wireless terminal T is the same as the delegate wireless terminal D. Then if the packet contains a message X, then the message X is transmitted by the base station only once, to wireless terminal D. If the packet contains a label Y, then the receiving network node sends the message label Y to delegate wireless terminal D, which identifies the message X. Because D is the intended terminal, no further steps are needed.

In embodiments where multiple delegate terminals are used, if one of the delegate terminals leaves the cell served by the receiving network node, then the corresponding information in the receiving node is lost. For example, revisiting the case of two delegates, suppose D0 leaves the cell. The receiving network node is aware that it lost D0 based on wireless communications protocols. The receiving network node informs the transmitting network node of the loss (e.g., via the backhaul link). The transmitting network node wipes out its own storage for the labels starting with a 0, but keeps the storage for the label starting with a 1 (i.e., the 1 referring to labels intended for and stored at delegate wireless terminal D1). The receiving network node designates a new terminal to replace D0, and the new delegate wireless terminal starts with a clean slate. The other delegate D1 maintains its storage. This approach generalizes naturally to the case of four terminals and beyond.

As described above, the loss of a delegate wireless terminal is the equivalent to wiping out all the storage in the case of a single delegate, and part of the storage in the case of multiple delegates. This loss of storage translates into a loss of compression, as it is necessary to repopulate the storage so that successful matches occur more often.

One way to offset this loss of compression is to delegate the same job to multiple wireless terminals. For example, revisiting the case of a single delegate D, another terminal D' may also be designated as a delegate. D' would be a redundant delegate, maintaining the same receiving node function.

If D and D' do not eavesdrop, then the receiving network node needs to transmit a message X to them individually. If D and D' do eavesdrop, then no additional transmissions from the receiving network node are needed. If the receiving network node needs to transmit a label Y, then it can choose to transmit to one of them, say D, which retrieves a message X and sends the message X back to the receiving network node, or possibly directly to the intended terminal, as discussed earlier. The other delegate, in this case D', does nothing. The receiving network node may choose one delegate all the time, and keep the other as insurance, or it may alternate between them in some fashion.

This redundancy approach generalizes naturally to the case of distributed delegation (i.e., multiple delegate wireless terminals).

What is claimed is:

1. A method performed at a delegate wireless terminal in a wireless communication system using terminal aided backhaul compression, comprising:
   receiving, at the delegate wireless terminal, a message label from a network node, wherein the message label identifies a first message stored in a memory of the delegate wireless terminal, and wherein the delegate wireless terminal is a delegate for storing messages to be communicated from a transmitting network node to a receiving network node using backhaul compression;

identifying, at the delegate wireless terminal, based on the received message label, the first message stored in the memory of the delegate wireless terminal;

transmitting, at the delegate wireless terminal, the first message to an intended destination;

receiving, at the delegate wireless terminal, a second message from the network node;

in response to the second message corresponding to the message label, comparing, at the delegate wireless terminal, the second message to the first message;

in response to the second message being different from the first message, storing the second message in the memory with the message label, and deleting the first message from the memory; and in response to the delegate wireless terminal being disconnected from the receiving network node, erasing one or more messages and message labels stored in the memory that correspond to messages and message labels stored in the network node.

2. The method of claim 1, wherein the intended destination is another wireless terminal, and transmitting the first message to the intended destination comprises wirelessly transmitting the first message to a network node.

3. The method of claim 1, wherein the intended destination is another wireless terminal, and transmitting the first message to the intended destination comprises wirelessly transmitting the first message directly to the other wireless terminal.

4. The method of claim 1, wherein the intended destination is the delegate wireless terminal itself, and transmitting the first message to the intended destination comprises retrieving the first message from the memory.

5. The method of claim 1, further comprising:
prior to receiving the first message label from the network node:
receiving the first message from the network node;
determining a message label for the first message based on a predetermined mapping; and
storing the first message in the memory with the determined message label.

6. The method of claim 5,
wherein identifying, based on the received message label, the first message stored in the memory of the delegate wireless terminal comprises:
comparing the received message label received from the network node to the determined message label determined at the delegate wireless terminal and stored in the memory of the delegate wireless terminal; and
determining that the received message label is the same as the determined message label; and
wherein transmitting the first message to the intended destination comprises transmitting the first message stored in the memory of the delegate wireless terminal associated with the determined message label to the intended destination.

7. The method of claim 5, wherein receiving the first message from the network node comprises eavesdropping on transmissions between the network node and another wireless terminal.

8. A delegate wireless terminal in communication with a network node, comprising:
a memory;
a transceiver; and
a processor configured to execute computer instructions to:
receive a message label from the network node, wherein the message label identifies a first message stored in the memory, and wherein the delegate wireless terminal is a delegate for storing messages to be communicated from a transmitting network node to a receiving network node using backhaul compression;
identify, based on the received message label, the first message stored in the memory;
transmit the first message to an intended destination;
receive a second message from the network node;
in response to the second message corresponding to the message label, compare the second message to the first message;
in response to the second message being different from the first message, store the second message in the memory with the message label, and delete the first message from the memory; and
in response to the delegate wireless terminal being disconnected from the receiving network node, erase one or more messages and message labels stored in the memory that correspond to messages and message labels stored in the network node.

9. The delegate wireless terminal of claim 8, wherein the delegate wireless terminal is further configured to:
prior to receiving the message label from the network node:
receive the first message from the network node;
determine a message label for the first message based on a predetermined mapping;
store the first message in the memory with the determined message label.

10. The delegate wireless terminal of claim 9,
wherein identifying, based on the received message label, the first message stored in the memory of the delegate wireless terminal comprises:
comparing the received message label received from the network node to the determined message label determined at the delegate wireless terminal and stored in the memory; and
determining that the received message label is the same as the determined message label; and
wherein transmitting the first message to the intended destination comprises transmitting the first message stored in the memory associated with the determined message label to the intended destination.

11. The method of claim 9, wherein receiving the first message from the network node comprising eavesdropping on transmissions between the network node and another wireless terminal.

12. A method performed at a first network node of a wireless communications network configured for backhaul compression, the method comprising:
receiving a first message;
determining a message label for the message, wherein the message label is to identify the first message for backhaul compression;
determining that the determined message label is the same as a stored message label that is stored in a memory of the first network node;
comparing the first message to a second message stored in the memory with the stored message label, to determine whether the first message is the same as or different than the second message;

upon determining that the first message is the same as the second message, transmitting the determined message label to a second network node via a backhaul link;

upon determining that the first message is different than the second message, transmitting the first message to the second network node via the backhaul link, and storing, in the memory, the first message with the determined message label;

receiving an indication from the second network node that a first delegate wireless terminal is no longer connected to the second network node; and erasing one or more messages and message labels stored in the memory of the first network node that correspond to messages and message labels stored in the first delegate wireless terminal.

13. The method of claim 12, further comprising:

transmitting an identification of a new delegate wireless terminal to the second network node.

14. A first network node of a wireless communications network, the network node comprising:

a memory;

a transceiver; and a processor configured to execute computer instructions to:

receive a first message;

determine a message label for the first message, wherein the message label is to identify the message for backhaul compression;

determine that the determined message label is the same as a stored message label that is stored in the memory;

compare the first message to a second message stored in the memory with the stored message label, to determine whether the first message is the same as or different than the second message;

upon determining that the first message is the same as the second message, transmit the determined message label to a second network node via a backhaul link;

upon determining that the first message is different than the second message, transmit the received message to the second network node via the backhaul link, and store, in the memory, the first message with the determined message label;

receive an indication from the second network node that a first delegate wireless terminal is no longer connected to the second network node; and erase one or more messages and message labels stored in the memory of the first network node that correspond to messages and message labels stored in the first delegate wireless terminal.

15. The network node of claim 14, further configured to:

transmit an identification of a new delegate wireless terminal to the second network node.

* * * * *